United States Patent [19]

Bannon et al.

[11] Patent Number: 5,743,926
[45] Date of Patent: Apr. 28, 1998

[54] APPARATUS FOR SEPARATION OF LIQUID AND VAPOR IN DISTILLATION/FLASHING PROCESS

[75] Inventors: Robert Patrick Bannon, deceased, late of Fulshear, by Elizabeth Jane Bannon, executrix; Louis Edward Stein, Houston; William David Kief, Spring, all of Tex.; Krishna Rangraj Kaushik, Benicia, Calif.; Pui-Yuen Jeffrey Chan, Houston, Tex.

[73] Assignee: Shell Oil Company, Houston, Tex.

[21] Appl. No.: 691,155

[22] Filed: Aug. 1, 1996

[51] Int. Cl.$^6$ .................................................. B01D 45/12
[52] U.S. Cl. .................... 55/396; 55/397; 55/423; 55/424; 55/453; 55/456; 55/457; 95/269
[58] Field of Search ...................... 95/247, 248, 266, 95/269; 96/188, 193, 194, 195, 208, 216, 217; 55/456, 457, 450, 453, 454, 424, 423, 396, 397, 392, 394, 421

[56] References Cited

U.S. PATENT DOCUMENTS

| | | | |
|---|---|---|---|
| 1,471,088 | 10/1923 | Ballard | 55/456 |
| 1,686,066 | 10/1928 | Boyrie | 55/397 |
| 1,708,653 | 4/1929 | Boyrie | 55/396 |
| 1,930,476 | 10/1933 | Hawley | 55/397 |
| 1,950,285 | 3/1934 | Battle et al. | 183/2.7 |
| 1,994,110 | 3/1935 | Pittman | 96/188 |
| 2,186,344 | 1/1940 | Price | 55/456 |
| 2,323,707 | 7/1943 | Danz | 55/392 |
| 2,489,903 | 11/1949 | Kraft et al. | 55/423 |
| 2,709,504 | 5/1955 | Toth et al. | 55/450 |
| 2,726,198 | 12/1955 | Lowman, Jr. et al. | 196/77 |
| 2,897,147 | 7/1959 | Lely et al. | 208/366 |
| 3,538,684 | 11/1970 | Esterhoy, Jr. et al. | 55/457 |
| 3,603,062 | 9/1971 | Robbins et al. | 55/348 |
| 3,884,660 | 5/1975 | Perry, Jr. et al. | 55/396 |
| 3,885,934 | 5/1975 | Eads et al. | 55/457 |
| 3,885,935 | 5/1975 | Nutter | 55/457 |
| 4,140,212 | 2/1979 | O'Blasny et al. | 196/114 |
| 4,324,573 | 4/1982 | Eriksson | 55/396 |
| 4,622,103 | 11/1986 | Shirley-Elgood et al. | 202/195 |

FOREIGN PATENT DOCUMENTS

| | | | |
|---|---|---|---|
| 140003 | 2/1980 | Germany | 95/269 |
| 1487930 | 6/1989 | U.S.S.R. | 96/194 |
| 2239193 | 6/1991 | United Kingdom | 96/193 |

OTHER PUBLICATIONS

*Electr. World*, 178, 40 (Nov. 15, 1972). [Based on an unidentified report by L. Z. Condry, W. F. Lawrence, and R. Muter, Coal Research Bureau of West Virginia University, Morgantown, West Virginia.]

*Primary Examiner*—Duane S. Smith

[57] ABSTRACT

A portion of the feed line to a distilling column/flasher (or the like apparatus) is used as a flow-through cyclone to separate vapor and liquid components of the feed. Vortex flow is induced in the flasher feed line with a swirl vane assembly having drainage slots in the bottommost portion thereof for preventing entrapment of liquids therein. A shave-off device at the discharge end of the flasher feed line minimizes re-entrainment. The shave-off device includes a short cylinder, slightly smaller in diameter than the feed line and arranged coaxially therewith to form an annulus, which leads to a circular liquid collection chamber and collection chute draining into the flasher unit. Covers are removable for cleaning. The purpose of the shave-off device is to remove the liquids from the wall of the transfer (flasher feed) line in such a way that re-entrainment of liquids is minimized. The non-intrusive nature of the shave-off device minimizes vapor phase pressure drop.

13 Claims, 6 Drawing Sheets

APPARATUS FOR SEPARATION OF LIQUID AND VAPOR IN DISTILLATION/FLASHING PROCESS

BACKGROUND OF THE INVENTION

1. Field of the Invention

The field of this invention pertains to hydrocarbon processing and specifically hydrocarbon processing in a refinery sequence. This invention is particularly concerned with any type of separation device where liquids and vapors are to be separated prior to injection into a vessel. Of particular interest are cyclone/vortex methods for the separation of liquid and vapor components in distillation/flashing processes. The preferred field of invention comprises the use of this separation device in a feed stream conduit situated downstream of atmospheric distillation and immediately upstream of a hydrocarbon vacuum flasher unit.

2. Description of Related Art

In many distillation/flashing processes with mixed phase feed, entrainment of liquid droplets in the vapor rising from the feed zone is undesirable and detrimental to product purity. In prior vacuum flasher units, continuous problems arise concerning entrainment of liquid materials such as pitch in vaporous distillate materials.

In certain operations, such as crude oil distillation, vacuum flashing of crude oil residue, lube oil fractionation, and delayed coker fractionation, a few trays (or other contacting devices) directly above the feed zone are provided for the sole purpose of removing entrained droplets from the vapor.

One technique used in refineries to reduce this entrainment problem is the incorporation of a disentrainment or wash-oil section which seeks to knock all liquid droplets out of the vapor stream which is proceeding to the vapor outlet of the vacuum flasher. This is sometimes done with different packing or trays in the vacuum flasher unit or, alternatively, may comprise a spray device to disentrain the unwanted liquid from the vapor. The distillate used as wash liquid to remove the entrainment is downgraded to feed liquid value if dumped to the feed zone. Alternatively, it may be recycled to the feed system where only a portion of the contained distillate will revaporize and eventually be recovered as distillate product.

One problem with this type of disentrainment is that the bottom section of the disentrainment area produces a liquid material which is recycled to recover the distillate material entrained therein and later vacuum flashing. This recycle causes further entrainment problems.

The incorporation of the present invention should eliminate or reduce the necessity to have a separate entrainment section in the vacuum flasher at a point proximate to entry of the feed to the vacuum flasher.

In U.S. Pat. No. 1,930,476 to C. G. Hawley (Centrifix Corp.), a separating chamber has a lip and accumulator for liquid separation from the chamber wall.

U.S. Pat. No. 3,884,660 to M. D. Perry, Jr. et al. (Perry Equipment Corp.) discloses a one- or two-stage tubular gas-liquid separator with a swirl device in the inlet, with recirculation. Skimming is provided at an exit post 45.

U.S. Pat. No. 3,603,062 to C. H. Robbins et al. (General Electric Co.) discloses a gas-liquid separator with a primary liquid discharge passage and a secondary discharge passage for gas and liquid from the boundary layer.

In U.S. Pat. No. 1,950,285 to R. Battle et al. (Hanlon-Waters, Inc.), a liquid/gas separator is a cyclone having liquid receiving pockets 10 leading to drain ports 12.

In U.S. Pat. No. 4,324,573 to G. V. Eriksson, an oil/air separator for a pulsating compressed air stream has a scraper sleeve 3 for diverting oil from the air stream.

U.S. Pat. No. 4,140,212 to R. H. O'Blasny et al. (Vacsol Corp.) discloses a cyclonic distillation tower for a waste oil refining process in which a vortex-breaking means improves the separation of the vapor fraction from the bottom liquid fractions.

U.S. Pat. No. 2,897,147 to C. Lely et al. (Shell Dev. Co.) discloses a method and apparatus for the distillation of mixtures, such as hydrocarbon oils, including a vortex chamber in the distillation column into which the vapor feed is led tangentially and in which the vapors are separated from the liquid fractions.

U.S. Pat. No. 2,726,198 to M. C. Lowman et al. (Shell Dev. Co.) discloses a flash vaporizing method and apparatus employing a cyclone separator for the separation of liquid dispersions in the vapor feed.

U.S. Pat. No. 4,622,103 to J. R. R. Shirley-Elgood (Fisons plc) discloses a water still with a cyclone liquid-vapor separator in which a plurality of arcuate jets urge droplets of liquid, in a tangential direction with respect to the capped annulus, to impinge on a deflecting surface.

SUMMARY OF THE INVENTION

A portion of the feed line to a distilling column/flasher (or the like apparatus) is used as a flow-through cyclone to separate vapor and liquid components of the feed. Vortex flow is induced in the flasher feed line with swirl vanes, or, in an alternate embodiment, nozzles that are tangential to the cyclone section of the feed line.

A shave-off device at the discharge end of the flasher feed line minimizes reentrainment. The shave-off device comprises a short cylinder, slightly smaller in diameter than the feed line and arranged coaxially therewith to form an annulus, which leads to a circular liquid collection chamber and collection chute draining into the flasher unit. Covers are removable for cleaning. The purpose of the shave-off device is to remove the liquids from the wall of the transfer (flasher feed) line in such a way that re-entrainment of liquids is minimized. The non-intrusive nature of the shave-off device minimizes vapor phase pressure drop.

Applied to vacuum flashers, this scheme eliminates the need for a wash oil system and the recycle of wash oil to the feed heater. Distillate yield is increased by approximately one-half the recycle flow. In addition, the cyclone is more effective in removing entrained droplets than the currently practiced wash oil systems. Therefore, distillate quality is also improved.

The invention includes the incorporation of a swirl vane arrangement within a transfer pipe in such a way that a helical motion is imparted to the two-phase stream passing through the pipe. The helical motion will cause droplets of liquid to impact the walls of the pipe and agglomerate with liquids flowing along the wall in an annular flow regime. When incorporated in the feed line to a crude oil residual vacuum flasher, the need for a net production of slop spray to maintain acceptable levels of entrainment of pitch in lighter products is no longer necessary. The elimination of the slop spray could permit the vacuum flasher to operate at higher rates of throughput, and also at improved yields of clean products.

DESCRIPTION OF THE PREFERRED EMBODIMENTS

In Assignee's vacuum flasher, which is run at a deep vacuum (e.g., 20 mm Hg), heavy oils are heated to a very high temperature, e.g., 800° F., in order to vaporize everything that is easily vaporizable. What is left is the residue which goes into coker feed or No. 6 oil. Simple gravity separation is adequate at low flow rates. Applicants' invention is to use the transfer (or feed) line coming into the vacuum flasher with a device to produce centrifugal action which would then make the liquid and vapor separate before they enter into the vacuum flasher. The end product of the liquid component is residue which is collected at the bottom of the vacuum flasher and may become a component of asphalt or No. 6 oil. The lighter fraction, the vapor component, is condensed and mixed with heavy distillate or cat cracker feed.

A portion of the feed line to a distilling column/flasher is used as a flow-through cyclone to separate vapor and liquid portions of a two-phase feed. When this is done it is desirable to provide a device at the discharge end of the cyclone (entry to the vessel) to minimize reentrainment of liquid into the vapor. Such a device has been designed particularly for a refinery vacuum flasher, but the principles are generally applicable.

Figure 7:
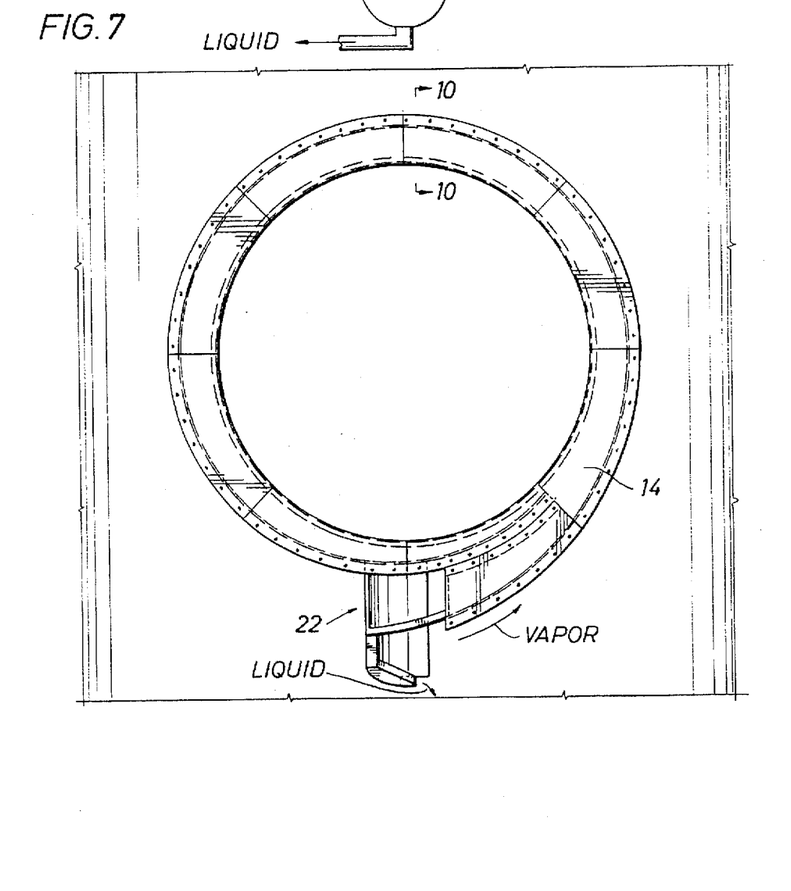
FIG. 7 is another embodiment of the invention analogous to FIG. 3.
Figure 8:
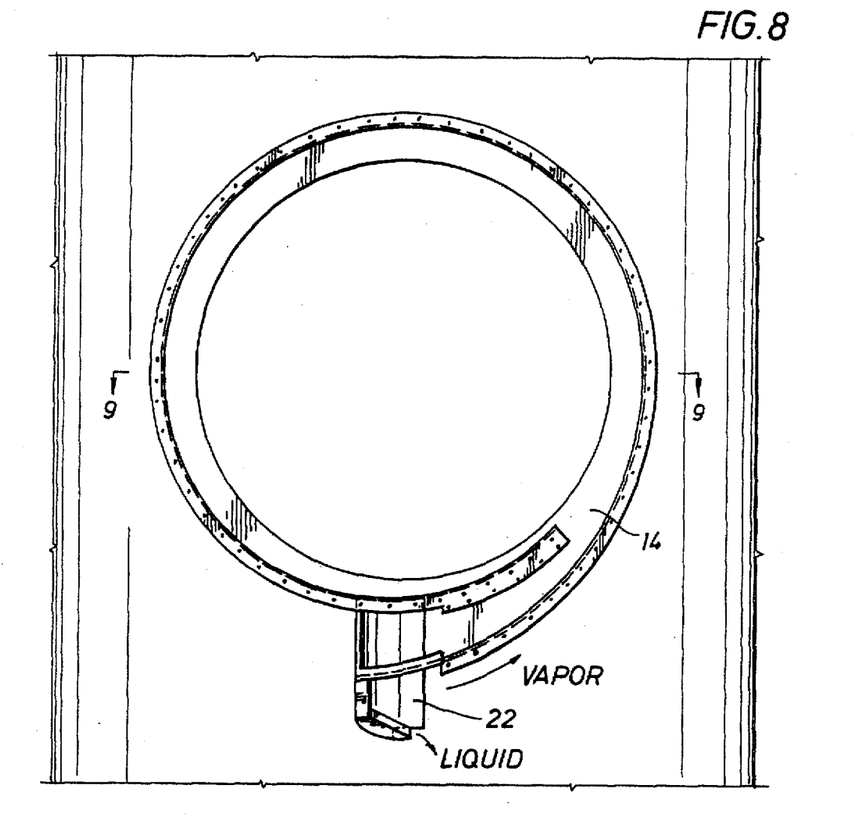
FIG. 8 is a sectional view of the gas-liquid separation device of FIG. 7 with the inner cylinder and cover plates removed.
Figure 9:
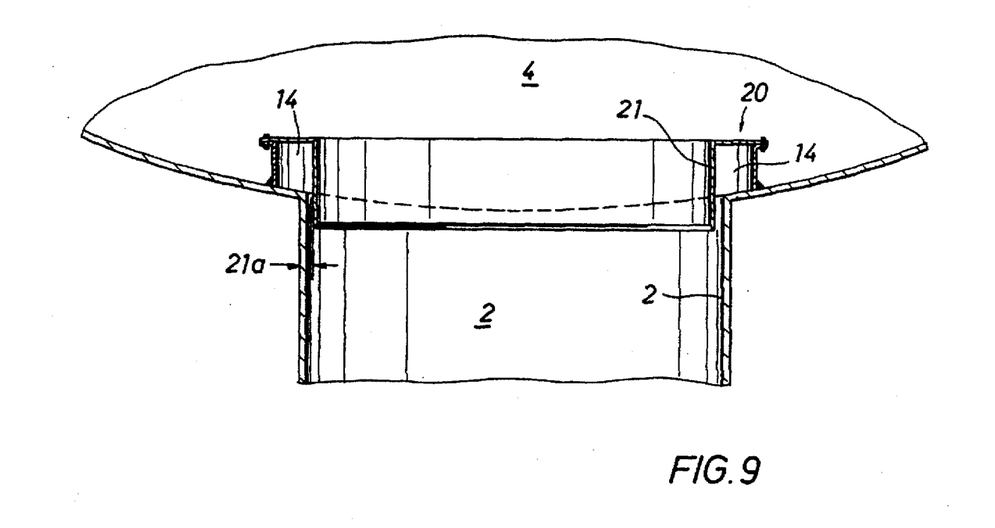
FIG. 9 is a top view of the shave-off device and collection chamber taken along line 9—9 of FIG. 3 or 8.
Figure 10:
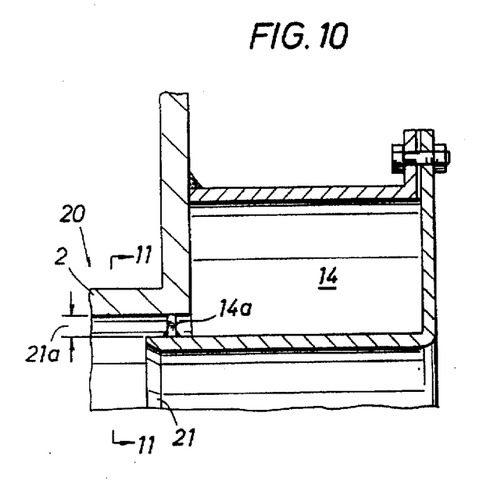
FIG. 10 is a cross section of the collection chamber taken along line 10—10 of FIG. 3 or 7.
Figure 11:
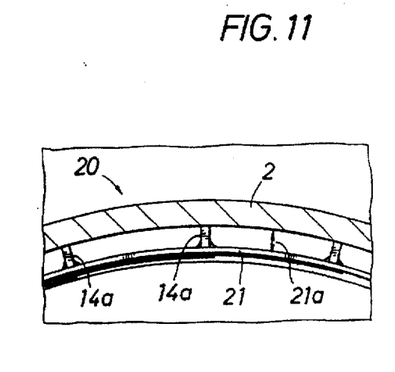
FIG. 11 is a sectional view of the annulus taken along line 11—11 of FIG. 10.
Figure 12:
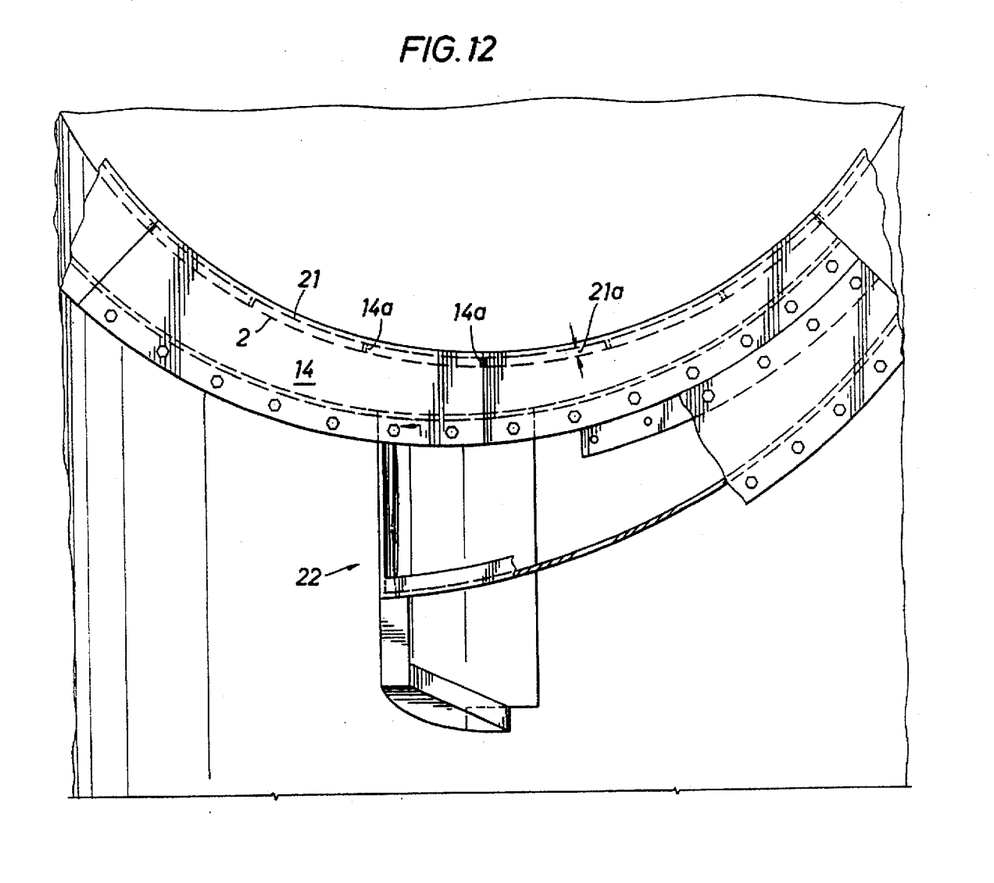
FIG. 12 is an enlarged front sectional view of the bottom of the collection chamber of FIG. 7.

The vapor/liquid feed stream emerges from the cyclone with the liquid traveling as a film along the wall and the vapor in the core. The shave-off comprises a short cylinder slightly smaller in diameter than the feed line and arranged such that the concentric cylinder and feed line form an annulus therebetween. Liquid, plus a small portion of the vapor, flows into the annulus and is collected by a liquid collection chamber while the bulk of the vapor flows inside the cylinder and directly into the flasher vessel. The annulus leads to a circular or spiral liquid collection chamber which includes a drain leg (collection chute) near its outlet. A drain opening is provided at the chamber low point to avoid liquid accumulation at that point and to direct the liquid into the chute where it is directed to the bottom of the flasher vessel. To prevent vapor which is exiting the collection chamber from entraining liquid flowing from the drain hole, a deflector plate (curved in the embodiment of FIG. 7) is used in the collection chute to keep these two flows separate.

The particular embodiments shown have several features specifically designed to cope with the possibility of coke formation. The inner cylinder and collection chamber cover are in sections which are removable for cleaning. The drain legs or collection chutes are open channels rather than pipes so they cannot become plugged with deposits.

The continuous phase that is flowing in the transfer pipe at a velocity on the order of 100 mph is vapor, i.e., hydrocarbon. It has in it a small percent, on a volume basis, of liquid that is entrained in this vapor phase. The two-phase mixture of vapor and entrained liquid enters into the vane assembly, which forces it to undergo a rapid centrifugal spin. The droplets experience centrifugal force, which causes them to move radially outward to the wall. The droplets coalesce on the wall and flow as a film which is skimmed-off by the aforementioned annulus and directed into the liquid collection chamber located at the discharge end of the transfer line. The liquid in some applications is called "pitch," a high molecular weight hydrocarbon. It is a heavy No. 6 oil, i.e., marine or bunker fuel oil.

Figure 1:
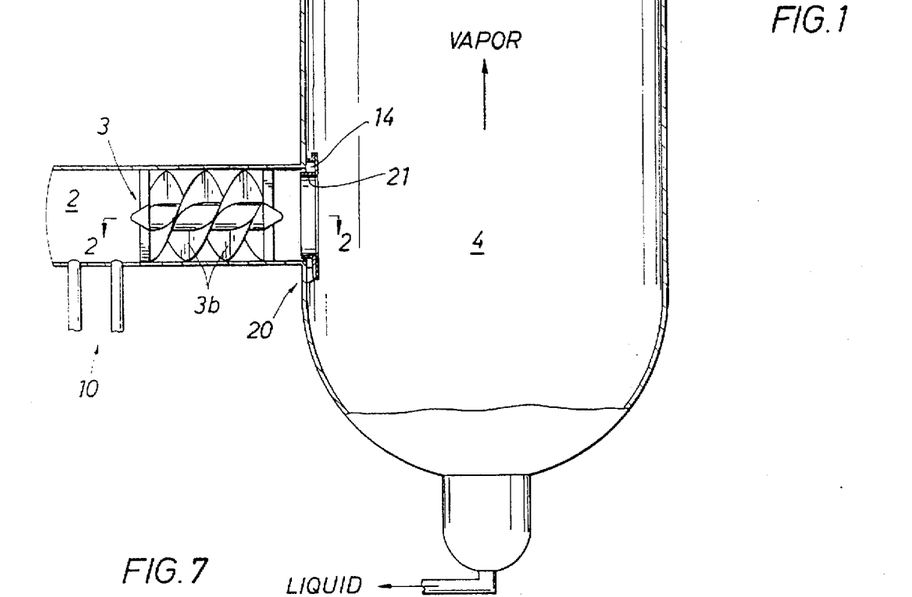
FIG. 1 is a schematic sectional view of a system incorporating the invention.

FIG. 1 shows a typical arrangement of swirl vanes within a feed line to a gravity-settling section of a vessel such as flasher vessel 4. Subheaders 10 would typically route the two-phase flow from furnace passes or heat exchange outlets to the transfer line 2. One or more sets of swirl vanes 3b are fixedly supported inside the transfer line 2 and downstream of the entrance of flow into the transfer line. The swirl vanes 3b impart a helical motion to the two-phase fluid flowing down the transfer line 2. Centrifugal force created by the spin will impart an outwardly directed radial momentum to the droplets thereby causing them to impact the wall of the transfer line 2. The larger the droplet, the greater the tendency to impact the wall of the transfer line. When the droplets impact the wall, they coalesce and stay on the wall and become part of an annular flow of liquids along the wall. Vessel 4, such as a vacuum flasher, is connected to the outlet of the transfer line 2. The flow from the transfer line exits the transfer line 2 and enters vessel 4. The entrance of the feed line 10 to the transfer line 2 could be tangential and thereby create an additional opportunity for the liquids to separate from the flowing two-phase mixture by centrifugal action ahead of the vane assembly 3. The vapor phase rises in the vessel 4 while the liquid phase is collected in the collection chamber 14, is directed to the bottom of the vessel 4 through chute 22, and is extracted therefrom as, for example, pitch.

The present invention is uniquely suited as a retrofit to a crude oil residual vacuum flasher when the existing transfer lines are of sufficient diameter to permit installation of effective swirl vanes. In a retrofit application such as this, it is possible to improve the effectiveness of the liquid-vapor separation below the lowest spray sections ("slop spray") of the vacuum distillation column to enable net slop spray to be recovered as product directly. Previous technology required that net slop spray be routed back to vacuum flasher feed. The net slop spray produced with previous technology contained a level of entrained residue which rendered the net slop spray unsuitable for use as a product.

Figure 2:
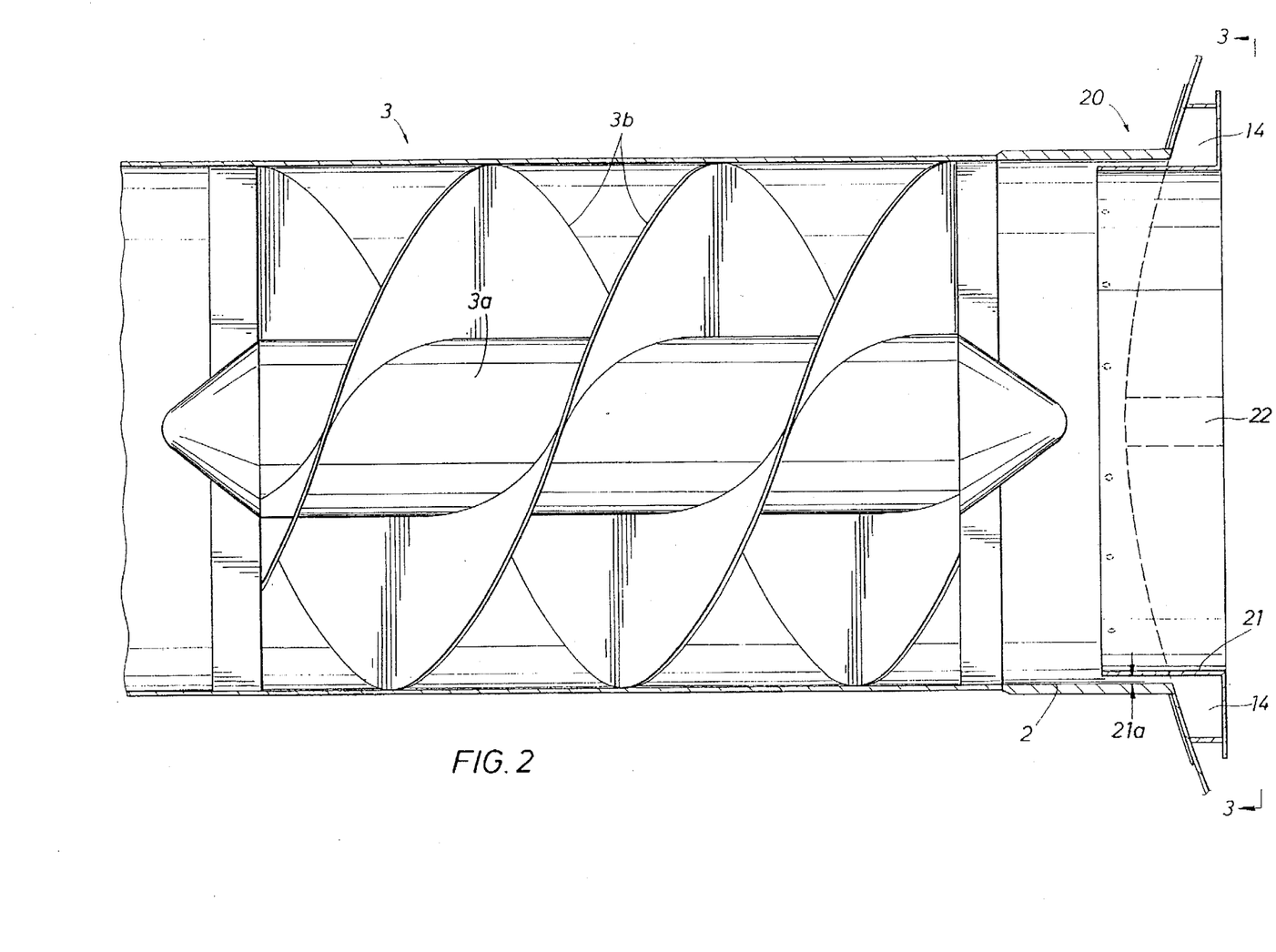
FIG. 2 is a sectional view of the swirl vane taken along line 2—2 of FIG. 1.

Fixedly attached to the inside of transfer line 2 is a swirl vane assembly 3, having vanes 3b, which is preferably formed on a hub 3a as shown in FIG. 2. The hub 3a supports the vanes 3b and serves to move the two-phase fluid closer to the wall of the transfer line 2 and to increase the centrifugal force acting on the droplets. The two-phase fluid is forced to travel the path defined by the vanes 3b. The vapor phase exits the transfer line 2 and enters the vessel 4 directly for further treatment. The liquid phase is collected by the liquid collection chamber 14, directed through the collection chute 22 to the bottom of the vessel 4 and is drawn off as, for example, pitch. At the junction point of transfer line 2 and vessel 4 is a liquid collection chamber 14, which is shown in more detail in FIGS. 5 and 6, and also FIG. 3, which is a view from inside the vessel 4 looking back upstream into the transfer line 2. The vane assembly 3 is securely connected to the wall of transfer line 2 by means of a stand-off 4a as shown in more detail in FIG. 4. The stand-off attachment means 4a is welded to the transfer line 2 in a spiral and is attached to the vanes 3b of vane assembly 3 by means of bolts 4b. This attachment means permits compensation for any out-of-round condition of the transfer line 2. Alternatively, the vane assembly 3 may also be directly attached to the transfer line 2 without the use of a stand-off, e.g., by welding.

The vane assembly 3 may consist of a parallel arrangement of two or more vane elements 3b creating a spiral-like array of curved and parallel plates. Alternatively, the vane may consist of only one vane or plate element formed into a spiral configuration. Alternatively, the vane assembly may consist of a circular array of flat plates or flat and curved plate sections arranged to impart rotational flow to the incoming liquid and vapor phase. The central hub 3a of the vane assembly 3 is a preferred embodiment of the invention but is not a requirement of the invention.

The design and position of the vanes 3b is of particular importance. If they are not long enough, some of the entering gas will "see" an opening, similar to looking through a fan blade, and some of the gas will go through the vane with insufficient rotation. With sufficient vane length and pitch, no gas escapes rotation. Individual vane elements comprising the vane assembly may wrap-around or spiral through a rotational angle which is greater than or less than 360 degrees. In the preferred embodiment shown in FIG. 2, the wrap-around angle is in excess of 360 degrees.

Another parameter of concern is the vane pitch or angle with respect to the hub 3a. If the vane angle or pitch is too low, insufficient separation of droplets from the vapor occurs. If the angle is too steep, excessive pressure drop results. So there is an optimum design angle of about 20–30 degrees.

Another parameter of concern is liquid detachment or liquid sloughing off the separator or transfer line 2 walls. The transfer line 2 diameter, together with the vane angle and hub diameter, must be designed such that, for the process operating conditions that prevail, the internal spin generated within the separator is sufficient to prevent liquid from detaching from the walls of the transfer line and becoming re-entrained in the vapor phase. Assignee's installation includes a transfer line 2 diameter of about 8.5 feet, having a length of about 16 feet. The vane assembly 3 is about 14 feet long, having a hub 3a diameter of about 2.5 feet. The vessel 4 diameter is about 32 feet.

If an upset occurs upstream in the heater and the system doesn't vaporize the stream, the pockets between the vanes 3b fill up and trap liquid hydrocarbon therebetween. The weight would become so heavy that it could collapse the structure. The outside edges of the vanes 3b are trimmed off, i.e., slotted near the bottom of the vanes to allow liquid to flow out of the transfer line 2 in the case of an upstream upset.

The drainage slots 3c are located near or at the bottom of each one of the vanes. The outer perimeter of each of the vanes or vane elements, near the floor or bottom of the transfer line, has a drainage slot 3c. In the embodiment shown in FIG. 3, the drainage slots are incorporated into the stand-off spiral 4a and are about 3 inches wide covering an arc of about 75 degrees.

A separation length sufficient to centrifuge the majority of the liquid to the wall is required. Separation is achieved within the vane assembly 3 and downstream of the vane. Spinning is started at the inlet of the vane assembly 3, and that is where the separation begins. Spinning is continued through the vanes, and even downstream of the vanes, until the liquid is taken off (i.e., separated) with the shave-off device 20.

Figure 3:
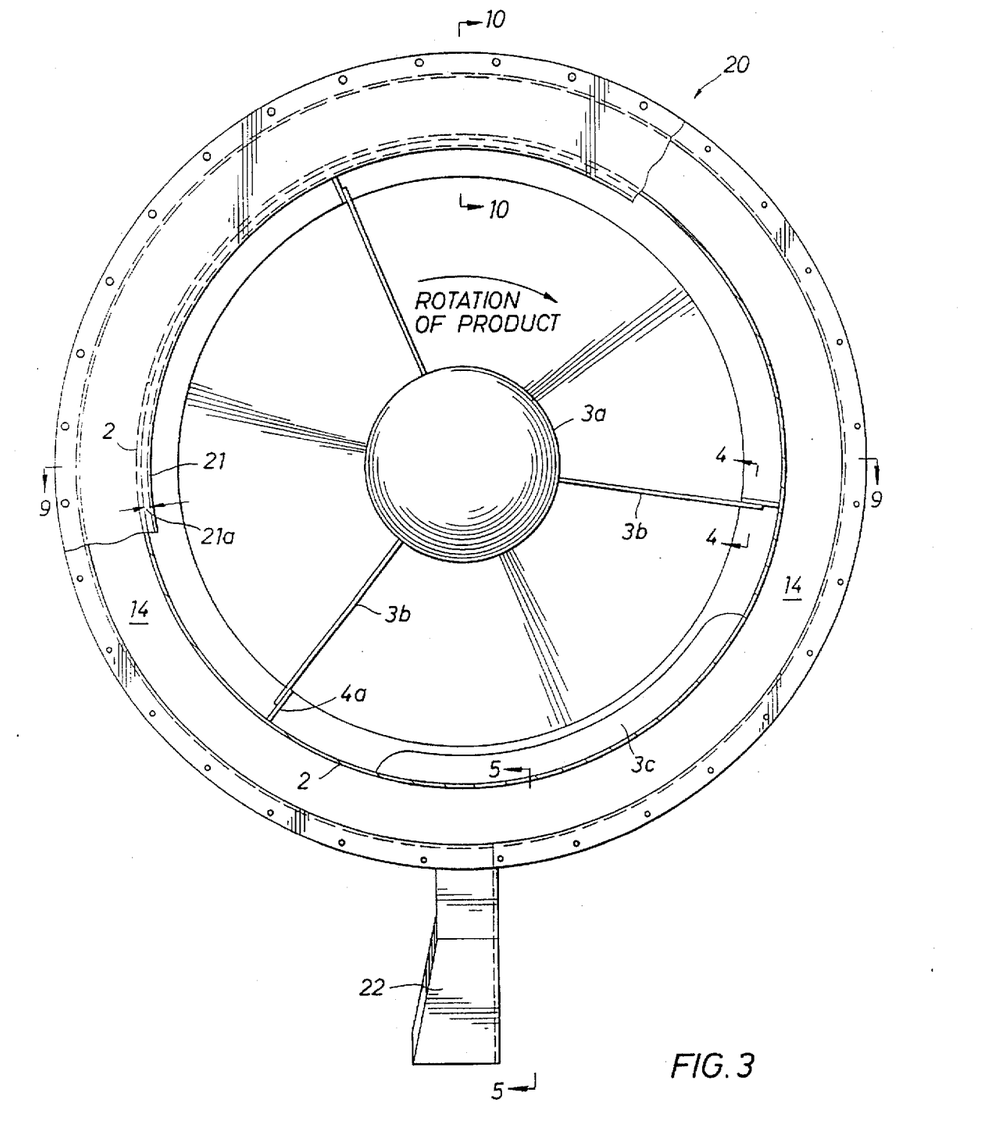
FIG. 3 is a sectional elevation view of the shave-off device taken along line 3—3 of FIG. 2.
Figure 4:
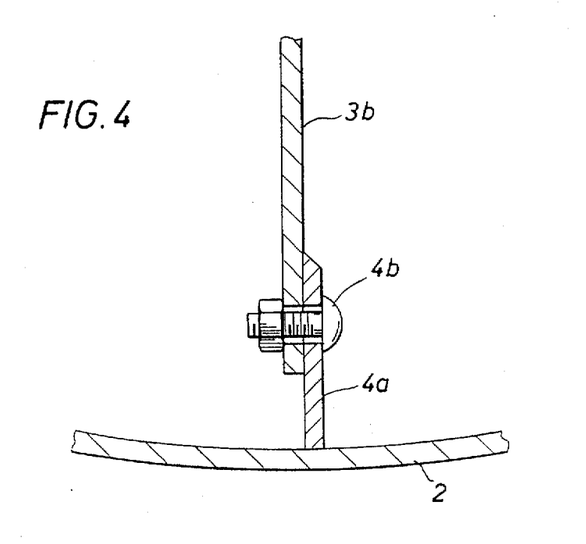
FIG. 4 is a sectional view of the vane attachment taken along line 4—4 of FIG. 3.

The shave-off device 20, in a preferred embodiment, is shown in FIG. 3 which is a view along the line 3—3 of FIG. 2. The shave-off device, shown generally at 20, comprises a short cylinder 21 which is slightly smaller in diameter than the transfer line 2 forming an annulus 21a therebetween through which the liquids flow into the collection chamber 14 (see FIG. 2). The chamber 14 surrounds the exit of transfer line 2 thereby forcing the liquid to flow downwardly through the collection channel 22. The liquid, as stated before, is collected within the bottom of separation vessel 4 as, for example, pitch. The major part of the vapor phase flows through the central opening of the shave-off device and directly into vessel 4 where it is directed upwardly.

The shave-off device 20 as shown is in a generally horizontal direction, but could be vertical or inclined. Determining the sizing of the shave-off slot, i.e., the annular gap 21a, requires careful consideration. If the annular gap 21a is too large, excessive amounts of vapors are blown in which then exit with the liquid. If this occurs, the vapors could entrain the liquids within vessel 4. If the annular gap 21a is too small, it will fail to catch all of the liquid, allowing some of the liquid to overflow the shave-off device 20 and to become reentrained within the vacuum flasher or vessel 4. The physical geometry of the shave-off also requires consideration. Vapor and liquid impact pressures may excite a natural frequency of the shave-off device 20 or collection chamber 14. This requires examination of the vibration frequencies of the shave-off device 20 and the collection chamber 14. Operation at a natural frequency of these devices must be avoided so that they resist vibration due to the flow excitation. The annulus in Assignee's application is 1.5 inches wide.

Figures 5, 6:
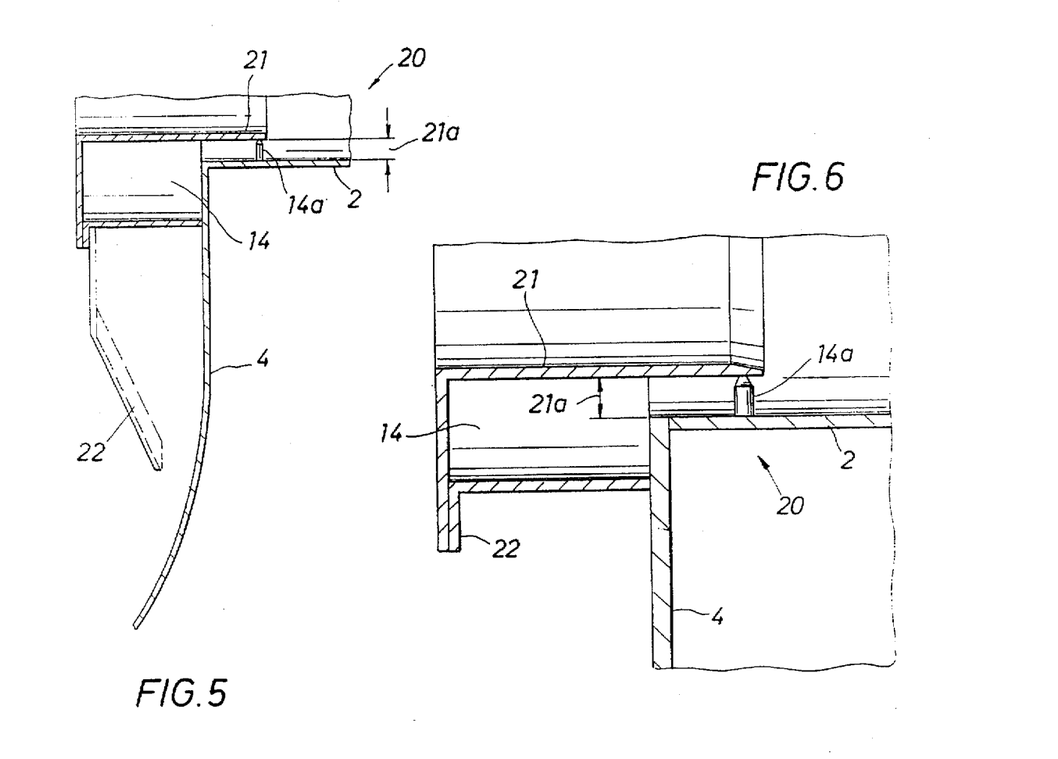
FIG. 5 is a sectional view of the liquid collection chamber and collection chute taken along line 5—5 of FIG. 3.
FIG. 6 is an enlarged sectional view of the liquid collection chamber of FIG. 5.

The collection chute 22 is shown in more detail in FIG. 5 which is a view taken along the line 5—5 of FIG. 3.

The liquid collection chamber 14 is shown in more detail in FIG. 6 which is an enlarged view of a portion of FIG. 5 and includes a plurality of centering pins 14a which define the annulus 21a.

FIGS. 7 through 12 depict another embodiment of the invention in which the shave-off device 20 scrolls outwardly in the 4th quadrant to form a liquid collection chamber 14 having a collection chute 22. This embodiment is more complicated and more expensive to build.

Another embodiment of the invention (not shown) includes a shave-off which scrolls outwardly in more than one quadrant, defining what may be regarded as a 180-degree, a 270-degree or a 360-degree scroll. Other scroll degrees, lying between 0 and 360, are also possible.

So, the overall purpose of the invention is to separate the two-phases, vapor and liquid, and to direct them into their receiving vessel, i.e., the vacuum flasher chamber or vessel 4, in such a manner that they remain separated within the vessel.

Although the drawings depict a clockwise rotation of the feed (as seen from the vessel 4), rotation could be counterclockwise. Likewise, the drawings depict a single transfer line entering the vessel 4 orthogonal to the axis of the vessel 4, whereas two or more transfer lines may be used. Where the primary feed lines 10 enter the transfer line 2 tangentially, they must be configured so as to aid the centrifugal action of the vane assembly 3.

What is claimed is:

1. A liquid/vapor separator for separating entrained liquid from vapor comprising:

a transfer tube having an input end for receiving a feed, said feed comprising a liquid entrained in a vapor, and an output end fluidly connected to the input of a vessel for delivering said feed to said vessel;

helical vane means located within said transfer tube for imparting centrifugal force to said feed whereby said heavier fluid components of said feed are forced to the inner wall of said transfer tube thereby separating the liquid and vapor components of said feed and wherein said helical vane means includes drainage slots in the bottommost portions thereof for preventing entrapment of liquid within said transfer tube;

means for collecting said separated liquid components of said feed;

means for directing said collected liquid components of said feed to said vessel; and separate means for directing said vapor component to a different portion of said vessel.

2. The separator of claim 1 wherein said helical vane means completes a 360° rotational angle within said transfer tube.

3. The separator of claim 2 wherein said helical vane means is fixedly attached inside said transfer tube.

4. The separator of claim 3 wherein said helical vane means is axially supported in said transfer tube on the edges of said vanes by stand-off means adapted for rigid connection to the edges of said vanes.

5. The separator of claim 3 wherein the edges of said vanes of said helical vane means are welded to said transfer tube.

6. The separator of claim 2 wherein said helical vane means is supported by a hub.

7. The separator of claim 6 wherein said hub diameter is a large portion of the diameter of said helical vane means.

8. The separator of claim 1 wherein said means for collecting said separated liquid components of said feed is an annulus formed at the output end of said transfer tube.

9. The separator of claim 8 wherein said annulus is formed by a concentric tube fixedly attached inside said transfer tube and separated therefrom.

10. The separator of claim 8 wherein said annulus is in fluid communication with said means for directing said liquid components to said vessel.

11. The separator of claim 10 wherein said means for directing further includes liquid chute means for directing said liquid components to the bottom of said vessel.

12. The separator of claim 4 wherein said drainage slots are incorporated in said stand-off means.

13. The separator of claim 1 wherein said helical vane means has a pitch lying in the range between about 20° and about 30°.

* * * * *